April 27, 1937.  W. V. METZ  2,078,866
SUPPORTING STANDARD
Filed Feb. 25, 1935
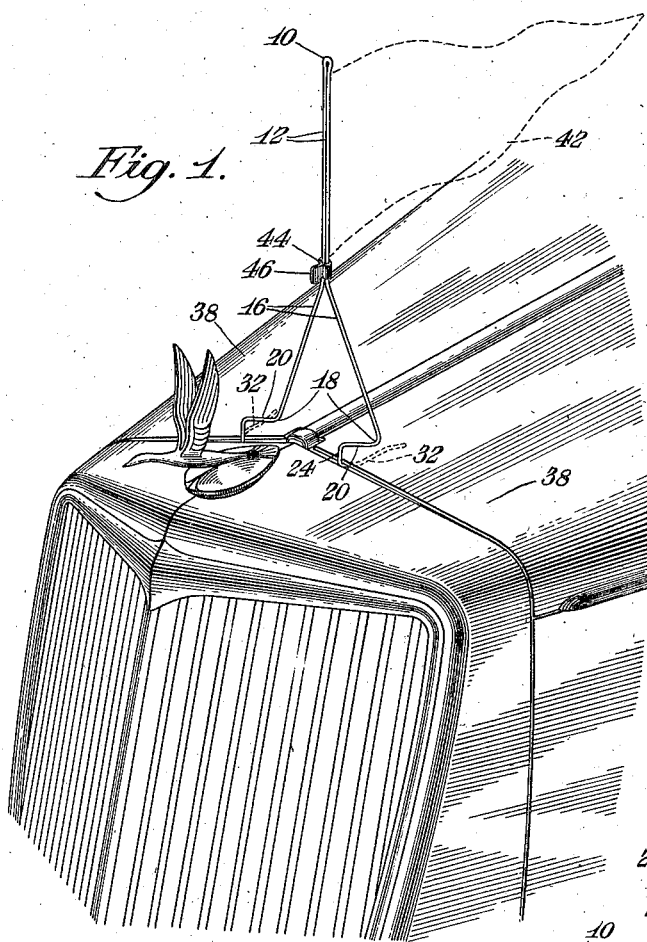
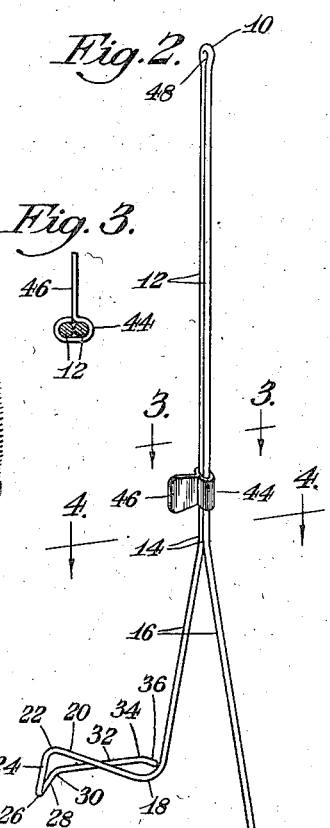
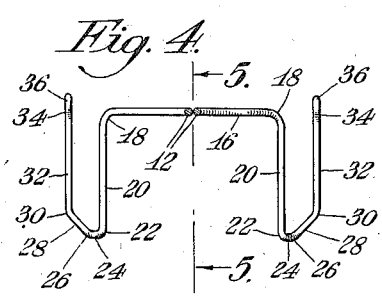
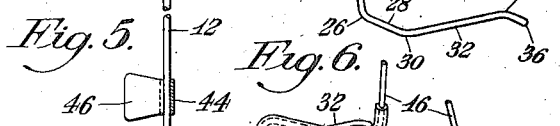
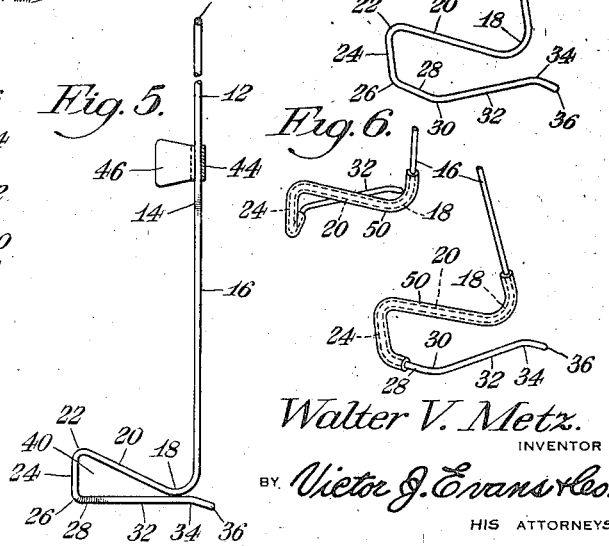
Walter V. Metz.
INVENTOR
BY Victor J. Evans & Co.
HIS ATTORNEYS Patented Apr. 27, 1937

2,078,866

UNITED STATES PATENT OFFICE 2,078,866

SUPPORTING STANDARD

Walter V. Metz, Brookfield, Ill.

Application February 25, 1935, Serial No. 8,144

1 Claim. (Cl. 248—229)

My invention relates to a display of decorations on an automobile, and has among its objects and advantages the provision of an improved supporting standard attachable to the leaves of the automobile hood.

The invention also embodies novel compensation for structural variations in different types of hoods.

In the accompanying drawing:

Fig. 1 is a perspective view of an automobile hood illustrating my invention applied thereto;

Fig. 2 is a perspective view of the standard;

Fig. 3 is a sectional view along the line 3—3 of Fig. 2;

Fig. 4 is a sectional view along the line 4—4 of Fig. 2;

Fig. 5 is a sectional view along the line 5—5 of Fig. 4; and

Fig. 6 is a perspective view of the leaf gripping parts illustrating a protective covering for the hood.

In the embodiment selected to illustrate my invention I make use of a piece of wire bent back upon itself at 10 to provide two parallel reaches 12, which reaches are bent at 14 to provide two angular reaches 16 simulating an inverted U. The reaches 16 are bent at 18 to provide a gentle curvature and two arms 20, each of which is bent at 22 to provide a vertical part 24.

The angle between the arms 20 and the reaches 16 is less than 90°, while the vertical parts 24 extend parallel to the reaches when viewed from the side, according to Fig. 5, or viewed from the front. Each vertical part 24 is bent at 26 to provide two short reaches 28 arranged at an angle to its associated arm 20 when viewed according to Fig. 4, but arranged at right angles to its associated reach 16 when viewed from the side according to Fig. 5.

Each of the short reaches 28 is bent at 30 to provide pinch elements 32 arranged each at right angles to its respective reach 16 (see Fig. 5) and in parallel relation with the other pinch element 32 (see Fig. 4). I bend the pinch elements 32 at 34 to provide a gentle curvature at the bend and to position the end 36 out of alignment with the pinch element.

The lower portions of the curvatures 18 extend into a plane common to the upper side of the pinch elements 32. In operation, the pinch elements 32 lie underneath the leaves 38 of the automobile hood, and the leaves are tightly pinched between the curvatures 18 and the pinch elements 32.

The vertical parts 24 provide separation between the arms 20 and the pinch elements 32, as indicated at 40, whereby accommodation is provided for leaves 38 which may have beads and other ornamental formations along their forward ends. In addition the angularity between the arms 20 and the pinch elements 32 localizes the pinching action inwardly of the forward ends of the leaves 38 so that a firm connection is attained irrespective of the specific shape of the forward ends of the leaves 38. Then too, the connection does not depend upon an accurate fit between the leaves and the ledge upon the radiator of the car which supports the leaves.

In Fig. 1 I have illustrated the parallel reaches 12 as constituting a standard for supporting a pennant or other ornamental attachment 42. I wrap a metallic strap 44 about the reaches 12 to prevent separation of the reaches at the bends 14. One end of the strap 44 is extended at 46 to provide a grip part.

The strap is wound loosely about the reaches so that it may be shifted therealong. In this way the strap may be shifted to the upper end of the reaches 12, whereby these reaches and the reaches 16 may be flexed in large amounts without permanently distorting the wire in cases where such a large amount of separation may be necessary in connecting the standard with the leaves 38. I separate the reaches 12 slightly at 48 within the bend 10 to provide an enlargement functioning as an abutment for the strap 44 when it is lifted upwardly.

In positioning the pinch elements 32 in spaced relation with the arms 20, as in viewing Fig. 4, I provide a construction in which an effective increase in the pinching action between the leaves 38 and the curvatures 18 and the pinch elements 32 is attained after installation, and with the leaves in the position of Fig. 1. In other words, when one of the leaves 38 is raised and the device is attached an increased pinching action results when the leaf is lowered because the leaves tend to separate the pinch elements 32 from the curvatures 18 due to the angularity of the top areas of the leaves.

Rubber tubing 50 may be placed upon the hood engaging parts to prevent scratching of the finish. The bent down ends 36 facilitate placement of the leaves 38 between the pinch elements 32 and the curvatures 18.

Without further elaboration, the foregoing will so fully explain my invention that others may, by applying current knowledge, readily adapt the same for use under various conditions of service.

I claim:

A supporting standard for connection with the leaves of an automobile hood, comprising a piece of wire bent back upon itself to provide two reaches arranged in juxtaposed relation, each reach being bent to provide a reach arranged at an angle to the juxtaposed reaches, each of said angular reaches being bent to provide a curved part, a resilient finger cooperating therewith for pinching connection with the leaves of the automobile hood within the perimeter of the latter, and means slidably mounted upon the juxtaposed reaches to support the same against separation.

WALTER V. METZ.